United States Patent [19]

Redmon et al.

[11] 4,446,887

[45] May 8, 1984

[54] VARIABLE HIGH PRESSURE CHOKE

[75] Inventors: Billy L. Redmon; Buford G. Forester, both of Pasadena, Tex.

[73] Assignee: Custom Oilfield Products, Inc., Houston, Tex.

[21] Appl. No.: 332,939

[22] Filed: Dec. 21, 1981

[51] Int. Cl.³ .................. F16K 37/00; F16K 3/16
[52] U.S. Cl. .................. 137/556; 251/124; 251/206; 251/328; 251/363
[58] Field of Search ............ 251/206, 124, 327, 363, 251/328; 137/556

[56] References Cited

U.S. PATENT DOCUMENTS

| | | | |
|---|---|---|---|
| 2,838,066 | 6/1958 | Harris | 137/556 |
| 3,005,617 | 10/1961 | Wolfensperger | 251/124 |
| 3,294,112 | 12/1966 | Watkins | 251/206 |
| 3,768,774 | 10/1973 | Baugh | 251/327 X |
| 4,337,920 | 7/1982 | Parris | 251/368 X |

Primary Examiner—A. Michael Chambers
Assistant Examiner—Stephen M. Hepperle
Attorney, Agent, or Firm—Neal J. Mosely

[57] ABSTRACT

A variable high pressure choke consists of a hollow valve body having a cylindrical cavity with a closed end, an open end and a cover or closure for the open end, and aligned tubular inlet and outlet portions on opposite sides thereof defining a straight bore intersecting the cavity at a right angle thereto. A tubular seal member is positioned in the bore with an end portion movable end-wise into the valve cavity. A flow selector member positioned in the cavity has a solid portion and a portion with flow controlling passages of different sizes; has a sliding fit between an extended position with the solid portion closing off the seal member end portion and successively retracted positions along the seal member to provide fluid flow openings of different sizes through the valve body. An operating stem connected to the flow selector has a threaded connection in the cover whereby rotation of the stem by a hand wheel raises the stem to move the flow selector. All joints and connections are adequately packed to prevent pressure leakage. A wear resistant flow reducer sleeve is positioned in the inlet portion and a wear resistant blast nipple sleeve in the outlet portion. The flow selector passages have wear resistant metal inserts. An alternate embodiment has a single teardrop shaped passage in the flow selector for varying flow therethrough. The rising operating stem also functions as a valve opening indicator.

28 Claims, 10 Drawing Figures

VARIABLE HIGH PRESSURE CHOKE

BACKGROUND OF THE INVENTION

1. Field of the Invention

This invention relates to new and useful improvements in high pressure chokes and more particularly to a variable high pressure choke of in-line construction.

2. Brief Description of the Prior Art

Adjustable choke valve of various types have been widely used throughout the oil and gas industry. Such valves are typically placed at or near the well head and are used to adjustably vary the flow of crude petroleum from the well head. A variety of types of choke valves are known commercially and are also known in the patent literature but are virtually all of an angle valve body design which results in a very substantial amount of wear or erosion during operation. In some of the older patents, choke valves are also referred to as flow beans.

Werts U.S. Pat. No. 2,510,356 discloses a flow bean or choke which has inlet and outlet openings to the valve body located at a right angle and a rotary valve member operated by a hand wheel.

Willis U.S. Pat. No. 3,207,181 discloses a multiple orifice type choke valve in which the inlet and outlet to the valve body are connected at a right angle.

McClure U.S. Pat. No. 3,683,965 shows an adjustable choke valve having a right angle body with rotary discs for controlling fluid flow.

Mischanski U.S. Pat. No. 3,026,899 discloses a valve of in-line structure having a rotary disk controlling flow.

Jones U.S. Pat. No. 3,827,511 discloses a hydraulically operated choke valve for use in oil field operation.

Neath U.S. Pat. No. 4,046,191 shows an improved method and apparatus for off shore drilling operations in which hydraulically operated chokes are used.

Lindsey U.S. Pat. No. 3,362,487 shows a control mechanism for a hydraulically actuated choke valve.

Baugh U.S. Pat. No. 3,477,526 shows another control mechanism for hydraulic chokes.

Willis U.S. Pat. No. 2,219,504 discloses a choke or flow bean which includes indicator mechanism for registering the position of the valve or flow bean element.

SUMMARY OF THE INVENTION

One of the objects of this invention is to provide a new and improved choke valve which is useful at high pressures and is resistant to corrosive and erosive wear.

Another object of the invention is to provide an improved high pressure choke valve which is of an in-line or straight through construction.

Still another object of the invention is to provide an improved high pressure choke valve which is of an in-line or straight through construction with a shut off plug having a flow selector passage or passages therein of different sizes or shapes for providing a variable fluid flow therethrough.

Yet another object of the invention is to provide an improved high pressure choke valve which is of an in-line or straight through construction with a flow reducing inlet and a wear reducing outlet and a valve plug with variable area passages therein for providing a variable fluid flow therethrough.

Another object of the invention is to provide an improved high pressure choke valve which is of an in-line or straight through construction with a rising stem operating a flow selector member and including an indicator registering the extent of opening of the choke.

Other objects of the invention will become apparent from time to time throughout the specification and claims as hereinafter related.

The above stated objects and other objects of the invention are accomplished by a high pressure choke which consists of a hollow valve body having a cylindrical cavity with a closed end, an open end and a cover or closure for the open end, and aligned tubular inlet and outlet portions on opposite sides thereof defining a straight bore intersecting the cavity at a right angle thereto.

A tubular seal member is positioned in the bore with an end portion movable end-wise into the valve cavity. A flow selector member positioned in the cavity has a solid portion and a portion with flow controlling passages of different sizes; has a sliding fit between an extended position with the solid portion closing off the seal member end portion and successively retracted positions along the seal member to provide fluid flow openings of different sizes through the valve body.

An operating stem connected to the flow selector has a threaded connection in the cover whereby rotation of the stem by a handwheel raises the stem to move the flow selector. All joints and connections are adequately packed to prevent pressure leakage. A wear resistant flow reducer sleeve is positioned in the inlet portion and a wear resistant blast nipple sleeve in the outley portion. The flow selector passages have wear resistant metal inserts. An alternate embodiment has a single teardrop shaped passage in the flow selector for varying flow therethrough. The rising operating stem also functions as a valve opening indicator.

DESCRIPTION OF A PREFERRED EMBODIMENT

Figure 1:
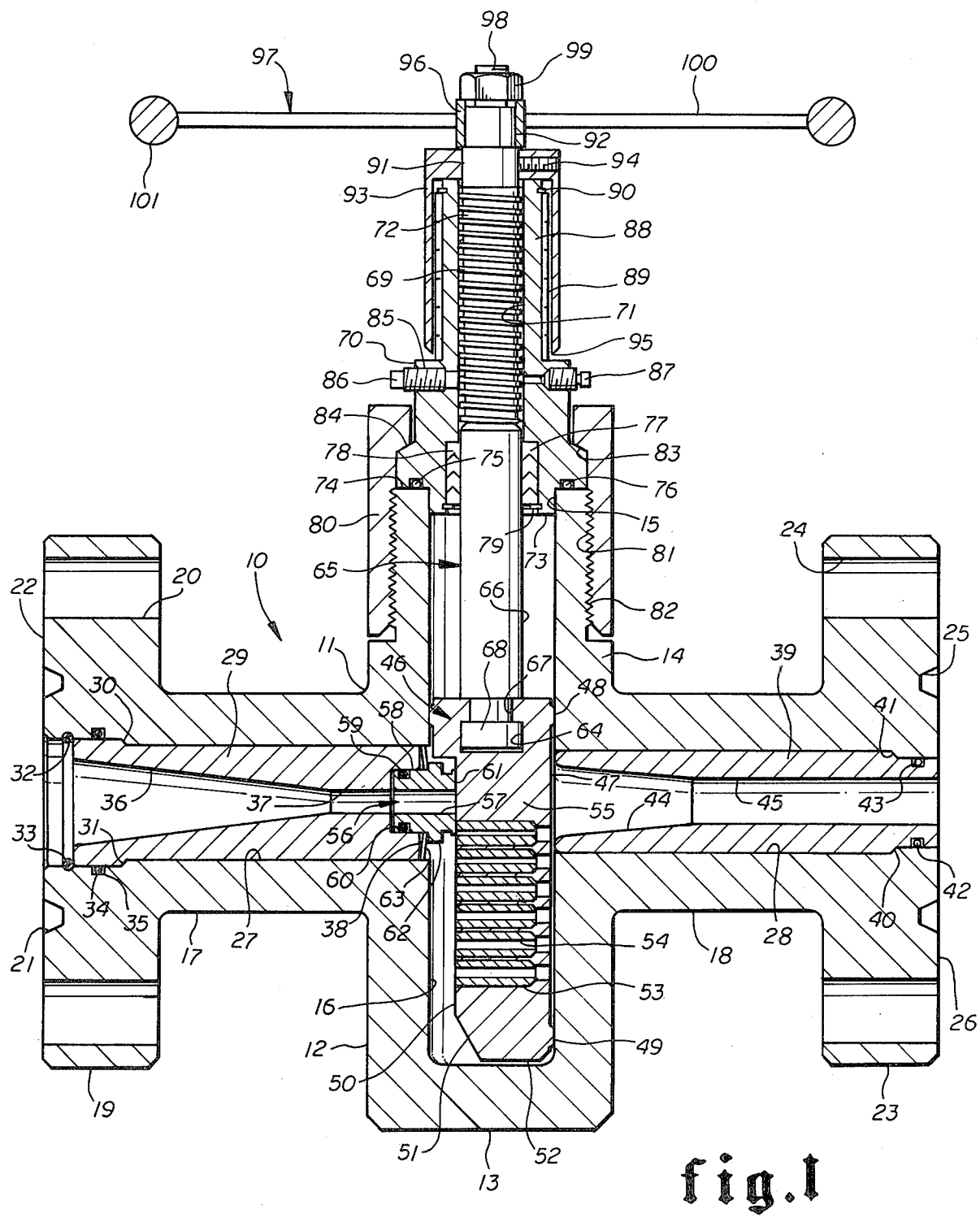
FIG. 1 is a view in longitudinal central section of one preferred embodiment of the variable high pressure choke of this invention in a closed or shut off position.
Figure 2:
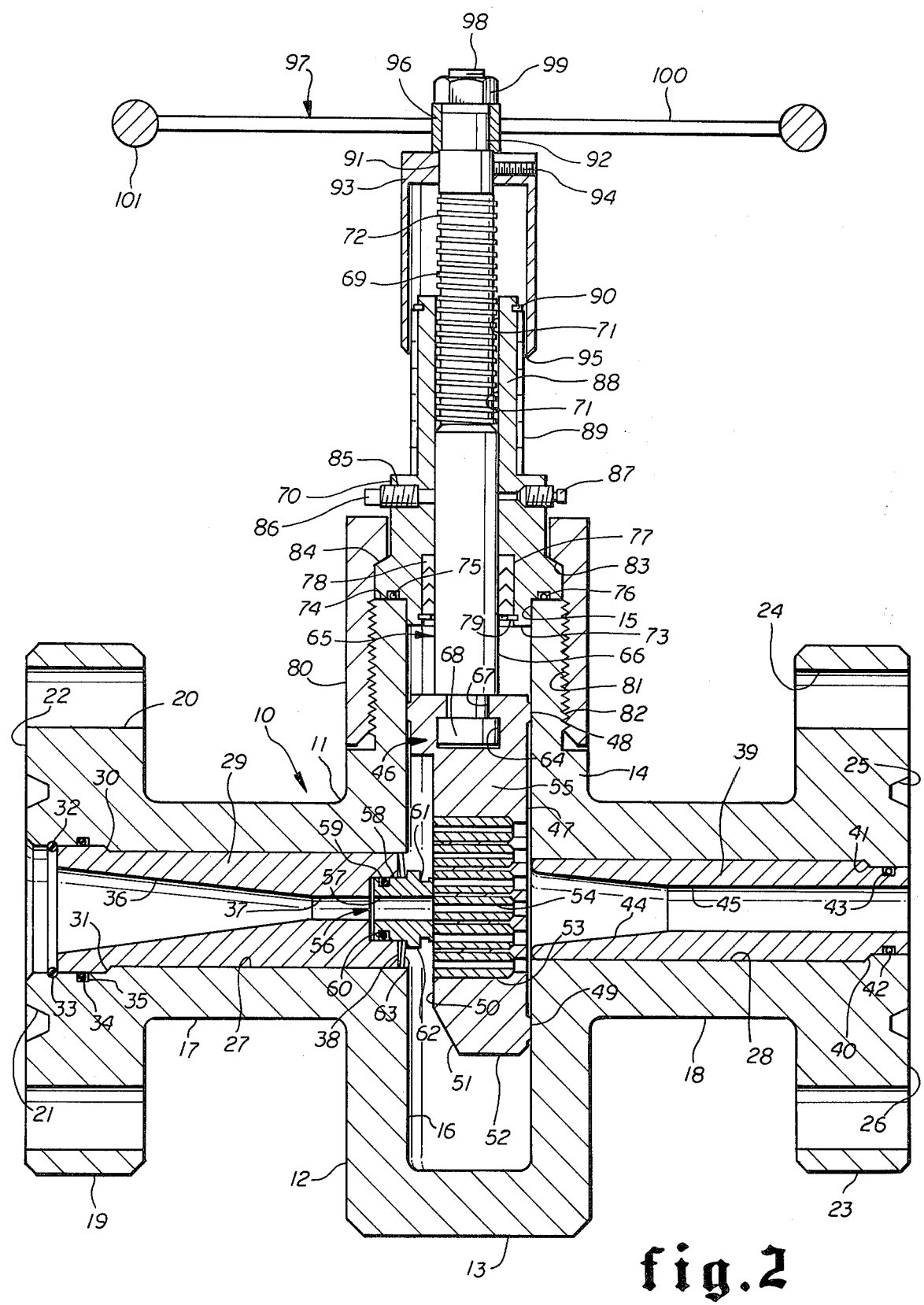
FIG. 2 is a sectional view showing the choke illustrated in FIG. 1 in one of the varying choke positions.
Figure 3:
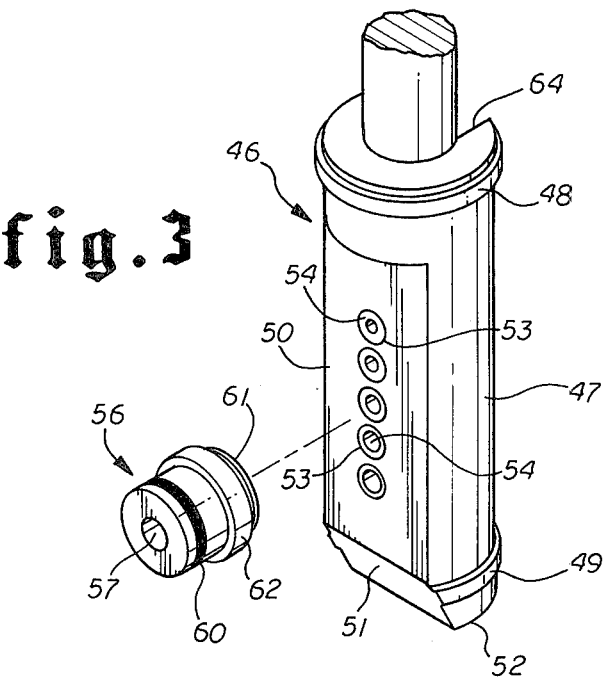
FIG. 3 is an isometric view of the variable choke or flow selector element in exploded relation to the flow seal element.
Figure 6:
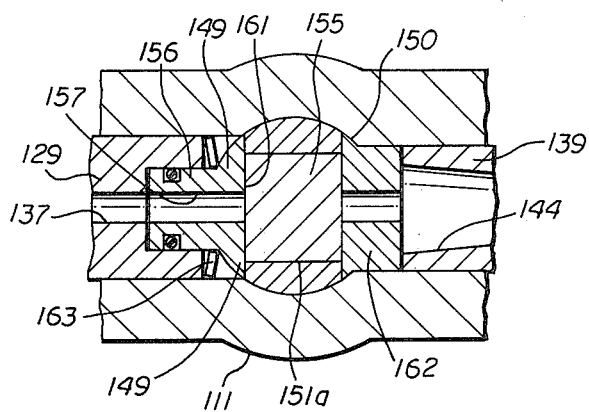
FIG. 6 is a sectional view taken on the line 6—6 of FIG. 5.

Referring to the drawings by numerals of reference, and more particularly to FIG. 1 and 2, there is shown a high pressure choke valve 10 for stopping the flow of high pressure fluids and gases or choking the flow to various reduced rates which may be varied in discrete increments in one embodiment or may be varied continuously in another embodiment. Choke 10 is designed for very high pressure operation for applications in the oil and gas or chemical industries. Choke 10 is made of materials which provide high strength and resistance against abrasive and corrosive wear.

Choke 10 comprises a tubular valve body 11 which is preferably made of a forged SAE 4130 alloy steel. Valve body 11 has a lower portion 12 with a closed bottom end 13 and an upper portion 14 with an open end 15. Valve body 11 has an interior cylindrical cavity 16 of uniform diameter extending from bottom end wall 13 to the top open end 15.

Valve body 11 has a tubular inlet portion 17 and a tubular outlet portion 18 on opposite sides thereof. Tubular inlet portion 17 is provided with an end flange 19 having holes or apertures 20 for bolting to a flanged conduit or a flanged connection on a container, pressure vessel or the like. An annular groove 21 in the end face 22 of flange 19 is provided to receive a sealing ring or gasket (not shown). Tubular outlet portion 18 likewise has a flange 23 with holes or apertures 24 for bolting to another flange connector on a conduit or pressure vessel or the like. Annular groove 25 in end face 26 is provided to receive a sealing ring or gasket.

Tubular inlet portion 17 has an internal bore 27 which opens into cavity 16 of choke valve body 11. Tubular outlet portion 18 likewise has an internal bore 28 which opens from choke valve body cavity 16. The bores 27 and 28 of tubular inlet portion 17 and tubular outlet portion 18, respectively, are aligned to provide a straight, in-line flow of fluid through the choke valve. The choke valve body 11 and cavity 16 are at a right angle to the tubular inlet portion 17 and tubular outlet portion 18 and the passages 27 and 28 therein.

Bore 27 in tubular inlet portion 17 has a flow reducer member 29 positioned therein. Flow reducer member 29 has a cylindrical outer surface which fits tightly in bore 27 and has a shoulder 30 which abuts shoulder 31 in bore 27. Flow reducer member 29 is secured in place by snap ring 32 which fits in peripheral groove 33 and is sealed against leakage by O-ring 34 which fits in peripheral groove 35. Flow reducer 29 has a longitudinally tapered or conical interior passage 36 which leads to an orifice or passage 37 of substantially smaller diameter. Flow reducer member 29 is preferably made of SAE 8620 carburized steel alloy. The end 38 of flow reducer 29 is at a point recessed from the opening of bore 27 into valve cavity 16.

A wear resistant blast nipple 39 is positioned in bore 28 of the valve body tubular outlet portion 18. Blast nipple 39 is preferably formed of silicon carbide to provide a high degree of resistance to abrasion and to corrosion. Blast nipple 39 has a smooth cylindrical outer surface which fits tightly in bore 28 with a shoulder 40 abutting shoulder 41 in bore 28. Blast nipple 39 is sealed against pressure leakage by O-ring 42 positioned in peripheral groove 43. Blast nipple 39 has a longitudinally tapered or conical passage 44 opening from valve body cavity 16. The smaller end of tapered passage 44 opens into a uniform diameter, cylindrical passage 45 extending to the outlet end of tubular outlet portion 18.

Valve body 11 has a flow selector member 46 positioned in cavity 16 for longitudinal or vertical sliding movement therein. Flow selector member 46 is generally cylindrical in shape and has a central body surface portion 47 which is recessed or under cut from the end portions thereof to define end flanges 48 and 49 which have a sliding fit on the inner cylindrical wall surface of cavity 16. Flow selector member 46 has a flat surface 50 which leads to a beveled surface 51 adjacent the lower end surface 52. Flow selector member 46 has a plurality of flow passages 53 extending from flat surface 50 on one side to the recessed or undercut cylindrical surface 47 on the opposite side.

Each of the passages 53 is provided with a tubular sleeve of wear resistant metal. The several tubular sleeves 54 have decreasing inside diameters so that the bottom most sleeve is of a relatively large inside diameter and the upper most sleeve is a relatively small orifice. The inlet ends of the several sleeves 54 terminate flush with the flat surface 50 of flow selector member 46. The upper portion 55 of flow selector member 46 is solid and provides a flow-obstructing valve for closing off flow through the inlet passage. The flow selector member 46 is preferably formed of an SAE 8620 carburized alloy steel. The sleeves 54 are preferably of tungsten.

A tubular adjustable seal insert member 56, preferably of silicon carbide, is positioned between the end of flow reducer 29 and flow selector 46. Tubular seal element 56 has a central passage 57 which is substantially the same diameter as the end portion 37 of flow reducer 29. The external surface of seal member 56 is cylindrical and fits into a counterbore 58 in the end of flow reducer 29. Adjustable seal 56 is sealed in counterbore 58 by O-ring 59 positioned in peripheral groove 60. The end surface 61 of seal member 56 is a flat, smooth surface having a smooth frictional engagement with the flat surface 50 of flow selector element 46. Adjustable sealing element 56 has a peripheral flange 62 which is engaged by a belleville spring 63 which urges the seal member into engagement with the smooth surface 50 of flow selector element 46.

The upper end of flow selector element 46 is provided with a T-slot which receives the end portion of an operating stem 65. Operating stem 65 has a smooth cylindrical outer surface 66 with a groove 67 cut therein to define a head portion 68 which fits into T-slot 64. Above the smooth cylindrical surface 66, stem 65 is provided with operating threads 69. Operating stem 65 is preferably of a corrosion resistant SAE 4130 alloy steel.

Valve operating stem 65 is supported for movement in a supporting yoke or bonnet 70 which closes the upper end 15 of valve body 11. Bonnet 70 is preferably formed of SAE 4130 alloy steel for corrosion and wear resistance. Supporting bonnet 70 has an internal bore 71 of smooth cylindrical shape which is of a size sufficient to accomodate the smooth cylindrical portion 66 and threaded portion 69 of operating stem 65 without binding. The upper end of supporting bonnet 70 has a bore of reduced diameter 72 which is threaded to meet with and receive the threaded portion 69 of operating stem 65.

The rotation of operating stem 65 results in the stem rising through a threaded opening 72 and lifting flow selector 46 through various selected retracted positions.

The lower end portion 73 of supporting bonnet 70 fits inside cavity 16 at the upper end 15 of valve body 11 with shoulder 74 abutting the open end of the valve body. This joint is sealed by an O-ring 75 fitted in peripheral groove 76. Supporting bonnet 70 has a counterbore 77 which receives packing 78 held in place by a retaining ring 79. Packing 78 is tightly compacted around the smooth cylindrical surface portion 66 of operating stem 65 to seal the same against pressure leakage.

Supporting bonnet 70 is secured in place by tubular cap member 80 which is preferably made of SAE 4130 alloy steel. Cap member 80 is internally threaded as at 81 and secured on the externally threaded surface 82 of the upper end portion 15 of valve body 11. Cap member 80 has an internal flange or shoulder 83 which abuts shoulder 84 on supporting bonnet 70 to secure supporting bonnet tightly on valve body 11. Supporting bonnet 70 has an internally threaded opening 85 in which a stem screw member 86 is positioned. On the other side of supporting bonnet 70, there is provided an Alemite fitting 87 for lubricating the operating stem 65.

Supporting bonnet 70 has a tubular extension 88 on which there are supported a plurality of ring members 89 which are secured in place by a snap ring 90. The groove between successive ones of the ring members 89 provides a visual indicator for movement of the valve stem.

The upper end of valve operating stem 65 beyond the threaded portion 69 is a smooth cylindrical surface having one portion 91 of a larger diameter and another portion 92 of a slightly smaller diameter and defining a shoulder therebetween. A cup shaped indicator member 93 is supported on cylindrical portion 91 of operating stem 65 and secured in place by a set screw 94. The bottom end 95 of cup shaped member 93 functions as an indicator for viewing the extent of upward movement of the valve operating stem 65.

The hub portion 96 of hand wheel 97 for operating the valve is positioned on the reduced cylindrical surface 92 of operating stem 65 against the shoulder between surfaces 91 and 92. The extreme upper end of operating stem 65 is threaded as at 98 and a retaining nut 99 provided thereon to secure hub 96 tightly in place. Hand wheel 97 has a plurality of spokes 100 which extend to an operating rim or wheel portion 101. Hand wheel 97, cup shaped indicator 93 and indicator ring 89 are not exposed to a particularly abrasive or corrosive environment and may be of a milder steel alloy such as SAE 1018 steel alloy.

ANOTHER EMBODIMENT OF THE INVENTION

Referring to the drawings by numerals of reference, and more particularly to FIGS. 5-10, there is shown another embodiment of the high pressure choke valve comprising this invention. The valve is of similar construction to the embodiment shown in FIG. 1 except for the construction and guiding of the flow selector element. Parts which are the same as those in FIG. 1 are given the same number raised by 100. Choke 110 is designed for very high pressure operation for applications in the oil and gas or chemical industries. Choke 110 is made of materials which provide high strength and resistance against abrasive and corrosive wear.

Choke 110 comprises a tubular valve body 111 which is preferably made of a forged SAE 4130 alloy steel. Valve body 111 has a lower portion 112 with a closed bottom end 113 and an upper portion 114 with an open end 115. Valve body 111 has an interior cylindrical cavity 116 of uniform diameter extending from bottom end wall 113 to the top open end 115.

Valve body 111 has a tubular inlet portion 117 and a tubular outlet portion 118 on opposite sides thereof. Tubular inlet portion 117 is provided with an end flange 119 having holes or apertures 120 for bolting to a flanged conduit or a flanged connection on a container, pressure vessel or the like. An annular groove 121 in the end face 122 of flange 119 is provided to receive a sealing ring or gasket (not shown). Tubular outlet portion 118 likewise has a flange 123 with holes or apertures 124 for bolting to another flange connector on a conduit or pressure vessel or the like. Annular groove 125 in end face 126 is provided to receive a sealing ring or gasket.

Tubular inlet portion 117 has an internal bore 127 which opens into cavity 116 of choke valve body 111. Tubular outlet portion 118 likewise has an internal bore 128 which opens from choke valve body cavity 116. The bores 127 and 128 of tubular inlet portion 117 and tubular outlet portion 118, respectively, are aligned to provide a straight, in-line flow of fluid through the choke valve. The choke valve body 111 and cavity 116 are at a right angle to the tubular inlet portion 117 and tubular outlet portion 118 and the passages 127 and 128 therein.

Bore 127 in tubular inlet portion 117 has a flow reducer member 129 positioned therein. Flow reducer member 129 has a cylindrical outer surface which fits tightly in bore 127 and has a shoulder 130 which abuts shoulder 131 in bore 127. Flow reducer member 129 is secured in place by snap ring 132 which fits in peripheral groove 133 and is sealed against leakage by O-ring 134 which fits in peripheral groove 135. Flow reducer 129 has a longitudinally tapered or conical interior passage 136 which leads to an orifice or passage 137 of substantially smaller diameter. Flow reducer member 129 is preferably made of SAE 8620 carburized steel alloy. The end 138 of flow reducer 129 is at a point recessed from the opening of bore 127 into valve cavity 116.

A wear resistant blast nipple 139 is positioned in bore 128 of the valve body tubular outlet portion 118. Blast nipple 139 is preferably formed of silicon carbide to provide a high degree of resistance to abrasion and to corrosion. Blast nipple 139 has a smooth cylindrical outer surface which fits tightly in bore 128 with a shoulder 140 abutting shoulder 141 in bore 128. Blast nipple 139 is sealed against pressure leakage by O-ring 142 positioned in peripheral groove 143. Blast nipple 139 has its end recessed in bore 128 from valve body cavity 116 and a longitudinally tapered or conical passage 144 opening therefrom. The smaller end of tapered passage 144 opens into a uniform diameter, cylindrical passage 145 extending to the outlet end of tubular outlet portion 118.

Valve body 111 has a flow selector member 146 positioned in cavity 116 for longitudinal or vertical sliding movement therein. Flow selector member 146 is shaped as a cylinder with parallel, smooth flat surfaces 147 and 148 on opposite sides thereof are beveled at their lower ends adjacent to the lower end surface 152. Filler members 149 and 150 (of SAE 4130 alloy steel) are positioned in cavity 116. These filler members are cylindrical segments having a cylindrical surface on one side, fitting the cylindrical wall of cavity 116, and a smooth plane surface on the other side. The plane surfaces of filler members 149 and 150 are parallel and spaced to receive and guide flow selector member 146 therebetween.

Flow selector member 146 has an elongated opening 151 receiving an insert member 151a having a plurality of flow passages 153 extending therethrough. The passages 153 may be provided with tubular sleeves of wear resistant metal. The several tubular sleeves 154 having decreasing inside diameters so that the lowest sleeve is of a relatively large inside diameter and the top sleeve is a relatively small orifice. The inlet ends of the several sleeves 154 terminate flush with the flat surfaces 147 and 148 of flow selector member 146. The upper portion 155 of flow selector insert member 151a is solid and provides a flow-obstructing valve for closing off flow through the inlet passage. The flow selector member 146 and insert 151a are preferably formed of an SAE 8620 carburized alloy steel. The sleeves 154 are preferably of tungsten.

A tubular seal insert member 156, preferably of silicon carbide, is positioned in opening 149a in filler member 149 and secured in place by silver soldering. Tubular seal element 156 has a central passage 157 which is substantially the same diameter as the end portion 137 of flow reducer 129. The external surface of seal member 156 is cylindrical and fits into a counterbore 158 in the end of flow reducer 129. Seal insert member 156 is sealed in counterbore 158 by O-ring 159 positioned in peripheral groove 160. The end surface 161 of seal member 156 is a flat, smooth surface having a smooth frictional engagement with the flat surface 147 of flow selector element 146. A belleville spring 163 is positioned around insert member 156 between the end of flow reducer 129 and filler member 149 and urges the seal member end 161 and flat surface of filler member 149 into engagement with the smooth flat surface 147 of flow selector element 146.

The filler member 150, on the downstream side of flow selector member 146 has an opening 150a with a sleeve 162 silver soldered therein. Sleeve 162 is of silicon carbide and has an inside diameter smaller than the seal member passage 157 and blast nipple passage 144. Sleeve 162 fits snugly against the end of blast nipple 139.

The upper end of flow selector element 146 is provided with a T-slot which receives the end portion of an operating stem 165. Operating stem 165 has a smooth cylindrical outer surface 166 with a groove 167 cut therein to define a head portion 168 which fits into T-slot 164. Above the smooth cylindrical surface 166, stem 165 is provided with operating threads 169. Operating stem 165 is preferably of a corrosion resistant SAE 4130 alloy steel.

Valve operating stem 165 is supported for movement in a supporting yoke or bonnet 170 which closes the upper end 115 of valve body 111. Bonnet 170 is preferably formed of SAE 4130 alloy steel for corrosion and wear resistance. Supporting bonnet 170 has an internal bore 171 of smooth cylindrical shape which is of a size sufficient to accomodate the smooth cylindrical portion 166 and threaded portion 169 of operating stem 165 without binding. The upper end of supporting bonnet 170 has a bore of reduced diameter 172 which is threaded to mate with and receive the threaded portion 169 of operating stem 165.

The rotation of operating stem 165 results in the stem rising through the threaded opening 172 and lifting flow selector 146 through various selected retracted positions. The lower end portion 173 of supporting bonnet 170 fits inside cavity 116 at the upper end 115 of valve body 111 with shoulder 174 abutting the open end of the valve body. This joint is sealed by an O-ring 175 fitted in peripheral groove 176. Supporting bonnet 170 has a counterbore 177 which receives packing 178 held in place by a retaining ring 179. Packing 178 is tightly compacted around the smooth cylindrical surface portion 166 of operating stem 165 to seal the same against pressure leakage.

Supporting bonnet 170 is secured in place by tubular cap member 180 which is preferably made of SAE 4130 alloy steel. Cap member 180 is internally threaded as at 181 and secured on the externally threaded surface 182 of the upper end portion 115 of valve body 111. Cap member 180 has an internal flange or shoulder 183 which abuts shoulder 184 on supporting bonnet 170 to secure supporting bonnet tightly on valve body 111. Supporting bonnet 170 has an internally threaded opening 185 in which a stem screw member 186 is positioned. On the other side of supporting bonnet 170, there is provided an Alemite fitting 187 for lubricating the operating stem 165.

Supporting bonnet 170 has a tubular extension 188 on which there are supported a plurality of ring members 189 which are secured in place by a snap ring 190. The grooves between successive ones of the ring members 189 provides a visual indicator for movement of the valve stem.

The upper end of valve operating stem 165 beyond the threaded portion 169 is a smooth cylindrical surface having one portion 191 of a larger diameter and another portion 192 of a slightly smaller diameter and defining a shoulder therebetween. A cup shaped indicator member 193 is supported on cylindrical portion 191 of operating stem 165 and secured in place by a set screw 194. The bottom end 195 of cup shaped member 193 functions as an indicator for viewing the extent of upward movement of the valve operating stem 165.

The hub portion 196 of hand wheel 197 for operating the valve is positioned on the reduced cylindrical surface 192 of operating stem 165 against the shoulder between surfaces 191 and 192. The extreme upper end of operating stem 165 is threaded as at 198 and a retaining nut 199 provided thereon to secure hub 196 tightly in place. Hand wheel 197 has a plurality of spokes 200 which extend to an operating rim or wheel portion 201. Hand wheel 197, cup shaped indicator 193 and indicator ring 189 are not exposed to a particularly abrasive or corrosive environment and may be of a milder steel alloy such as SAE 1018 steel alloy.

Figure 8:
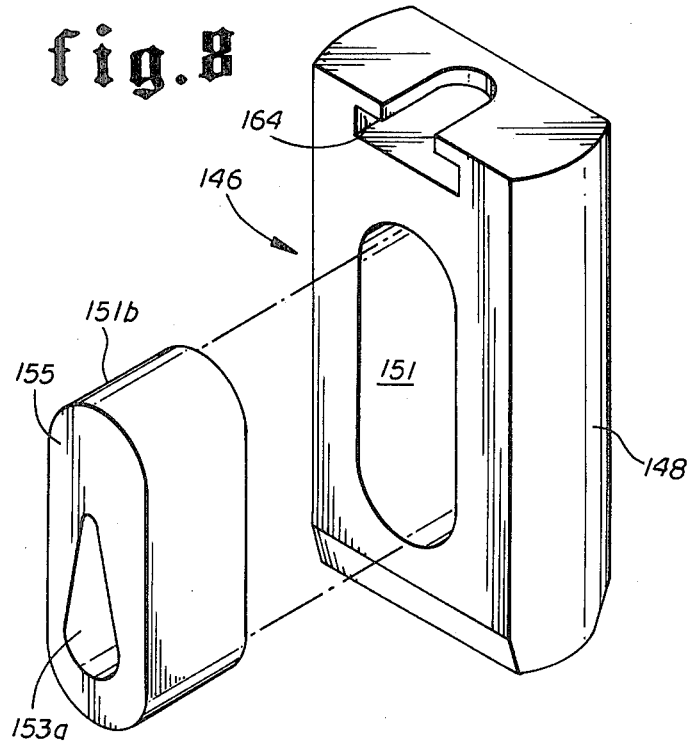
FIG. 8 is an isometric view, partially exploded, of another embodiment of the flow selector insert used in the choke shown in FIG. 5.
Figure 10:
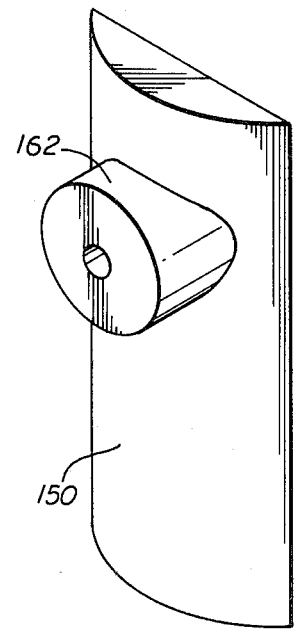
FIG. 10 is an isometric view of the other spacer member/insert assembly used to guide the movement of the flow selector in the choke shown in FIG. 5.

In FIG. 8, there is shown an alternate flow selector insert member 151b in exploded relation to the flow selector member 146. Insert member 151b has a single flow passage 153a with a tear drop shaped passage therethrough similar to the passage 53a in insert member 46a of FIG. 4.

OPERATION

The mode of operation of each of the embodiments of the invention should be fairly obvious from the description given above.

The choke described in FIGS. 1 and 2 is a forged steel choke valve of straight-through or in-line flow design which can be used for stopping the flow of high pressure fluids and gases completely or choking the flow to various selected levels. The valve body is preferably a forged alloy steel, e.g. SAE 4130 alloy steel, which permits the use of the choke in erosive and corrosive environments.

The choke valve 10 is shown in FIG. 1 in a closed or shut off position and in FIG. 2 in an intermediate choke position. In the closed or shut off position shown in FIG. 1, flow selector 46 is completely lowered to a position substantially abutting the end wall 13 of valve body portion 12. In this position, the solid body portion 55 of flow selector 46 cuts off flow of fluids through the valve bore.

The choke valve, in normal operation, has the inlet portion 17 connected to high pressure and the outlet portion 18 connected to an outlet line or connection. The inlet and outlet flanges are provided with suitable end seals (not shown) against leakage of high pressure fluids. Also, the valve body itself is provided with seals against leakage high pressure fluid at a number of points.

The choke valve 10 utilizes a reciprocally movable, generally cylindrical plug or flow selector 46 with various size orifices which may be selected and changed during operating conditions to control the flow of fluids or gases. The concept utilized in this choke valve is to keep the flow of fluids in a straight path to reduce turbulence and abrasive wear rather then turning a right angle as in chokes which are presently available commerically.

The flow of fluids in the choke valve 10 is reduced by a vortex flow reducer 29 which a tapered passage 36 leading to passage 37 aligned with seal insert 56. The reduction in flow by flow reducer 29 reduces the velocity of the fluids and reduces abrasive wear in the valve. This choke valve uses a silicon carbide blast nipple 39 on the outlet side to receive and absorb the abrasive wear downstream of the flow controlling orifices.

Flow through the choke valve 10 is adjusted by opening or closing hand wheel 89 from the closed or opened position to the desired opening as indicated by the flow indicator 95 read against the indicia provided by the indicator members 89.

The dimensions referred to in this description of operation are for purposes of illustration only and can obviously be changed to fit any particular desired design. The dimensions given are for a choke valve which may be used on a 2" line and pressures of about 10,000 psi. The flow of fluid or gas enters the choke valve 10 through flow reducer 29 and is reduced from a 2" opening down to the ¾" opening 37. It then enters the moveable seal insert 56 which is formed of silicon carbide material. Seal insert 56 preferably has a ¾" orifice 57 and the end face 61 is held against the flat surface 50 of flow selector 46 by the line Pressure or by the pressure differential through the choke. At very low operating pressures, belleville spring 63 holds the seal insert 56 against the flat face 50 of flow selector 46. O-ring 34 prevents pressure from by passing flow reducer 36 and entering the valve body. Also the O-ring seal 59 between the seal insert 56 and flow reducer 29 prevents pressure from entering the choke valve body.

The pressure differential through seal insert 56 holds the seal insert in tightly abutting relation to the smooth surface 50 of flow selector 46. This provides a positive seal against pressure leakage into the valve body. In the position shown in FIG. 1, seal insert 56 is held in tightly abutting position against an upper solid portion 55 of flow selector 46 which represents a tightly shut off or closed position.

The flow selector 46 is graduated from the blank surface or solid portion for complete shut off through flow orifices ranging from 6/64" through 32/64". Flow selector 46 has 6 orifices plus a blank positive shut off. The orifices are defined by the tungsten tubular inserts 54 which protect the choke against wear. Obviously, the number of orifices and the sizes thereof could be varied according to the particular application of the choke.

Flow selector 46 is movable from the completely shut off position shown in FIG. 1 to any of the intermediate choking positions, as shown in FIG. 2 by rotation of hand wheel 97. Rotation of hand wheel 97 causes stem 65 to rise and retract flow selector 46. The position of the flow selector is indicated by the bottom edge or indicator portion 95 of the cup shaped member 93 as read against the indicia formed by the indicator rings 89. This is apparent from the position of the choke as shown in FIG. 2. Stem lock 86 is provided to secure stem 65 against rotation when hand wheel 97 has moved the stem and flow selector 46 position the desired orifice in alignment with flow selector 56.

Flow selector 46 and seal insert 56 may be changed at any time, provided that the pressure is secured or shut off upstream from the choke. The entire flow selector 46 may be removed by removing the cap 80 that secures the yoke assembly or bonnet 70 and stem 65 in place. The flow selector 46 is connected to stem 65 by T-slot 64, as previously described. Once the flow selector 46 has been removed, the seal insert 56 may be removed with a suitable tool. Seal insert 56 and flow selector 46 may be inspected for abrasive wear and replaced if necessary. To assemble, the seal insert 56 must be installed prior to installing the flow selector 46 and securing cap 80 in place. Flow reducer 29 and blast nipple 139 may be removed when the flow selector 46 and seal insert 56 have been removed. Flow reducer 29 and blast nipple 139 may be inspected and replaced as needed.

Figure 4:
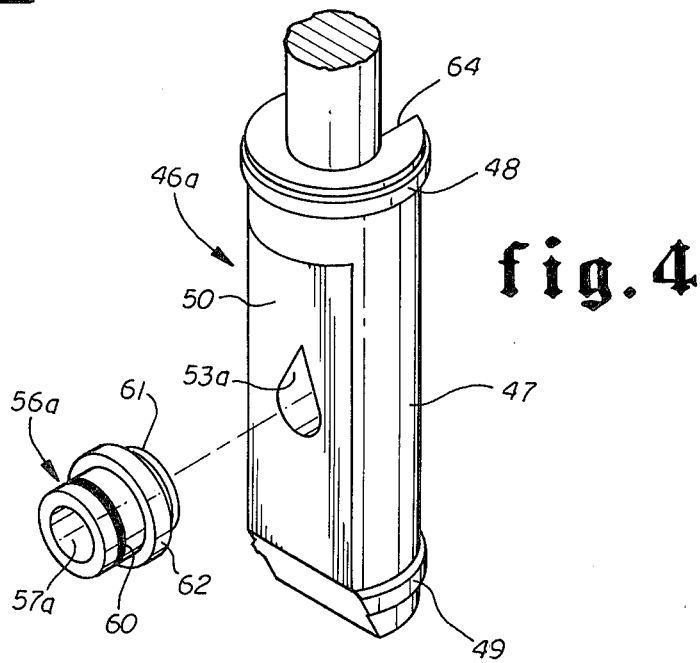
FIG. 4 is an isometric view of another variable choke element in exploded relation to the flow seal element.
Figure 5:
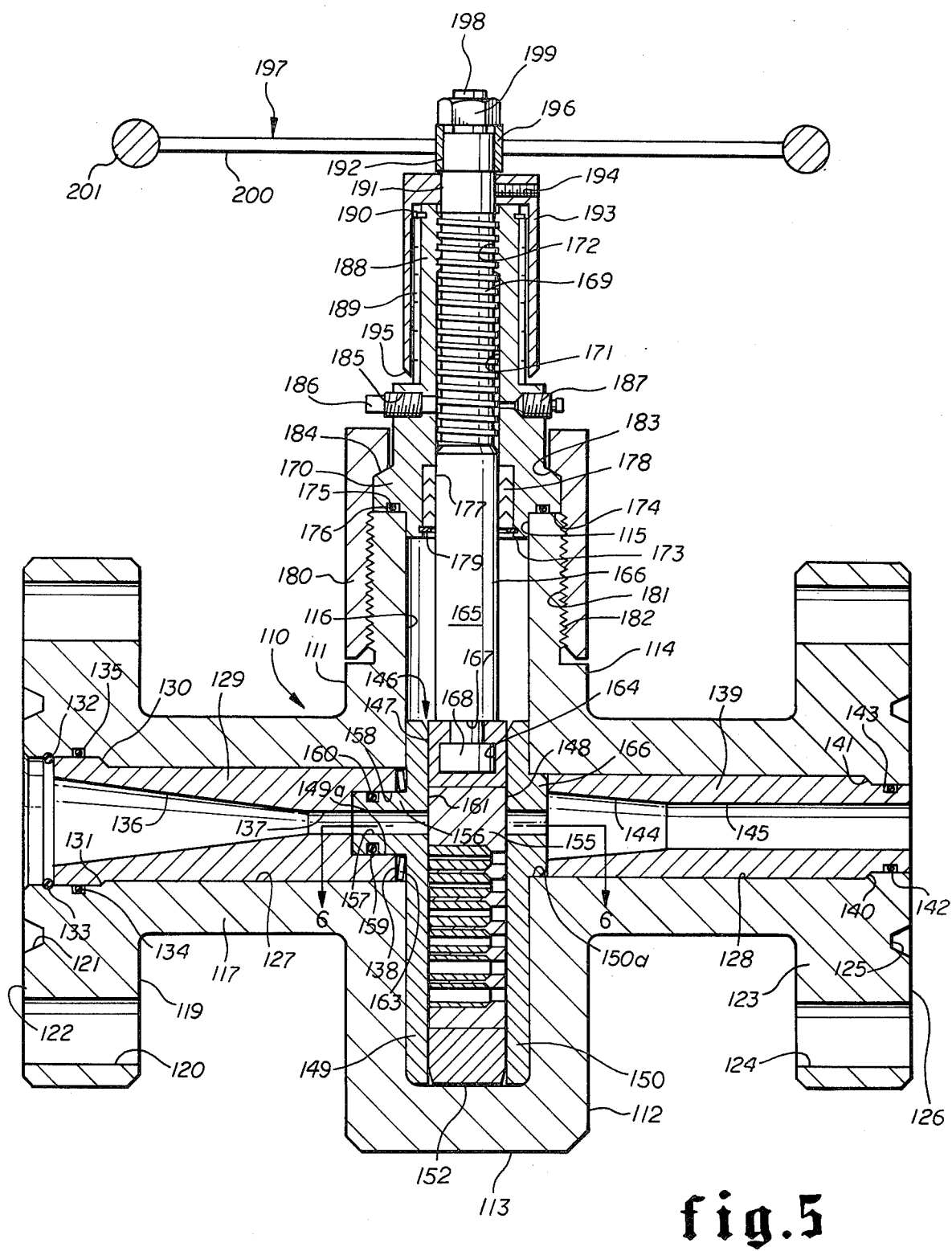
FIG. 5 is a view in longitudinal central section of another preferred embodiment of the variable high pressure choke of this invention in a closed or shut off position.
Figure 7:
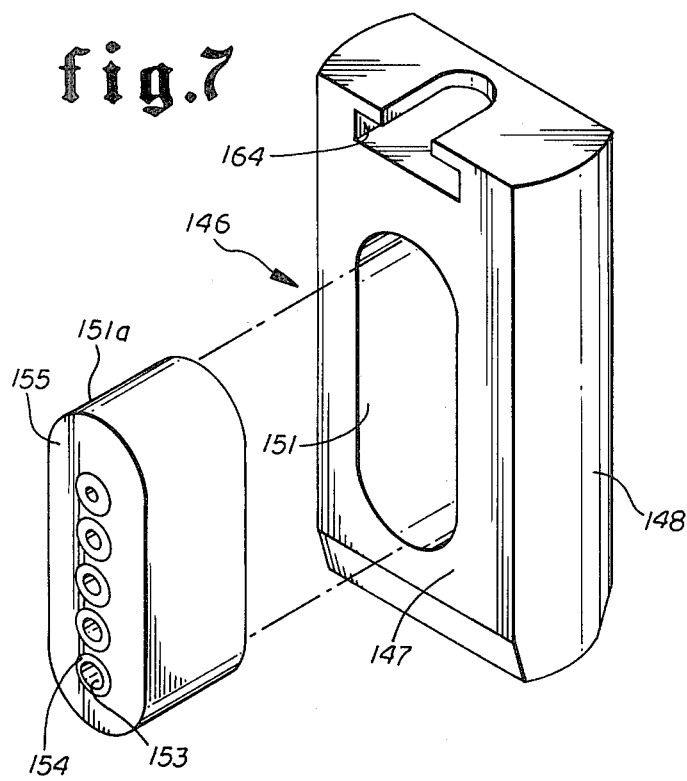
FIG. 7 is an isometric view, partially exploded, of the flow selector insert used in the choke shown in FIG. 5.
Figure 9:
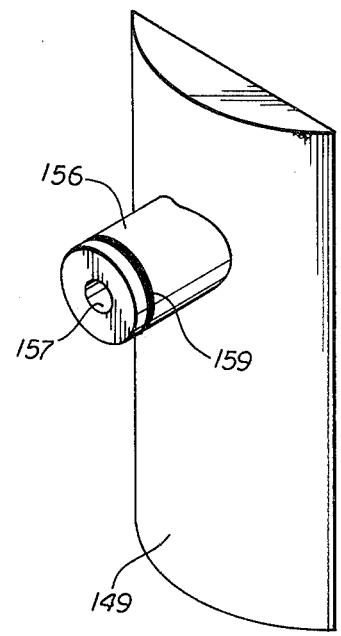
FIG. 9 is an isometric view of one of the spacer member/insert assemblies used to guide the movement of the flow selector in the choke shown in FIG. 5.

This choke valve may be converted from an incremental adjustment to a continuously adjustable choke by changing flow selector 46 to flow selector 46a shown in FIG. 4. Seal insert 56a is also substituted for seal insert 56. The flow selector 46a has a single passage 53a which has a cross section of tear drop shape. Flow selector 56a has its internal orifice 57a of a size sufficient to accommodate the full size opening of flow selector orifice 53a.

In this embodiment, movement of flow selector member 46a moves tear drop orifice 53a relative to opening 57a in seal insert 56a and tapers the size of the opening from 0, when fully closed, to ¾" diameter opening when fully opened.

The alternate embodiment shown in FIGS. 5-10 functions in the same manner as just described except that the selector member is guided for movement between insert filler members 149 and 150. Also, the flow passages are in a removable insert as described.

The choke valve asembly shown and described above, including the various modifications thereof, has several advantages over present commercially available chokes. Firstly, the flow of abrasive fluids are directed through the choke in a straight line path and do not turn a right angle corner creating turbulence and erosion problems. The use of forged alloy steel bodies and parts for high pressure and corrosive environments gives a substantial improvement. The design of this choke allows for low operating torques even in high pressure applications.

This choke has quick easy access to parts for inspection and changing of parts which are exposed to corrosive or erosive conditions. The flow of fluids is graduated down by a hardened vortex flow reducer 29 which protects the valve body from erosion. The valve parts that are exposed to abrasion and wear are made of of silicon carbide material for maximum wear life. The valve body portion down stream from the flow-controlling orifices which is exposed to a high pressure blast flow is protected by blast nipple 39 which may be changed when worn.

This choke valve can be used as a positive choke with the advantages of several orifice sizes to use in controlling pressure and volume of fluids and gases. As noted from the description of FIG. 4, this choke can be changed to a continuously adjustable apparatus which is more satisfactory for handling large volumes of fluids and gases. This choke provides a positive seal in shut off position which is not exposed to wear and abrasion during conditions of fluid flow. The design of this choke meets and exceeds all requirements of the A.P.I.

While this invention has been described fully and completely with special emphasis upon several preferred embodiments of the invention, it should be understood that within the scope of the appended claims, this invention may be practiced otherwise than as specifically described herein.

We claim:

1. A variable high pressure choke comprising
   a hollow valve body having an open end, a closed end and a cylindrical cavity therein,
   cover means for said open end,
   aligned tubular inlet and outlet portions on opposite sides of said valve body defining an upstream side, a downstream side and a straight bore intersecting said cavity at a right angle thereto,
   a tubular seal member in said bore having an end portion positioned in said cavity,
   said tubular inlet portion including a tubular insert of wear resistant metal having a longitudinally tapered cross section operable to reduce the rate of fluid flow therethrough and having a recess in the reduced diameter end portion thereof,
   said tubular seal member being of a wear resistant material and surrounded by resilient sealing material and supported in said recess in said tapered tubular insert and having an end face operable to provide the sole seal between the upstream and downstream sides of said valve body,
   a flow selector member in said cavity having a solid, flow-obstructing portion and a portion with flow controlling passage means extending therethrough,
   said flow selector member having a sliding fit in said cavity between an extended position with said solid portion in flow obstructing relation to said seal member end portion and movable to successively retracted positions moving said flow controlling passage means relative to said seal member to provide fluid flow passages of different areas,
   said flow selector member having unsealed metal-to-metal sliding contact with the wall of said cavity on the downstream side thereof and sealed on the upstream side solely by engagement with the end face of said seal member, and
   operating means on said cover means for moving said flow selector member between said extended and retracted positions and including sealing means preventing pressure leakage during operation thereof.

2. A variable choke according to claim 1 in which
   said flow controlling passage means comprises a plurality of separate passages extending transversely through said flow selector member, and
   said separate passages being of different cross sectional areas and movable successively into alignment with said seal member end portion to permit a selected flow therethrough.

3. A variable choke according to claim 2 in which said separate passages each includes a tubular sleeve insert of wear resistant metal.

4. A variable choke according to claim 3 in which said sleeve inserts are of tungsten.

5. A variable choke according to claim 1 in which
   said flow controlling passage means comprises a single passage extending transversely through said flow selector means, and
   said single passage having a cross sectional configuration varying in width whereby movement thereof relative to said seal member end portion provides a variable fluid flow opening.

6. A variable choke according to claim 5 in which said single passage has a cross section of a tear drop shape.

7. A variable choke according to claim 1 in which said flow selector member has an undercut central surface portion on the downstream side thereof through which said passage means opens.

8. A variable choke according to claim 1 in which
   said cavity has a pair of insert filler members, each having one surface of cylindrical shape fitting the cylindrical wall thereof, and smooth flat walls positioned parallel to each other,
   said selector member has smooth flat parallel faces whereby it fits between said filler members for sliding movement therebetween, and
   said flow selector member having a removable insert member through which said passage means opens.

9. A variable choke according to claim 8 in which
   said flow controlling passage means comprises a plurality of separate passages extending transversely through said flow selector insert member, and
   said separate passages being of different cross sectional areas and movable successively into alignment with said seal member end portion to permit a selected flow therethrough.

10. A variable choke according to claim 9 in which said separate passages each includes a tubular sleeve insert of wear resistant metal.

11. A variable choke according to claim 10 in which said sleeve inserts are of tungsten.

12. A variable choke according to claim 8 in which
    said flow controlling passage means comprises a single passage extending transversely through said flow selector insert member, and
    said single passage having a cross sectional configuration varying in width whereby movement thereof relative to said seal member end portion provides a variable fluid flow opening.

13. A variable choke according to claim 12 in which said single passage in said insert member has a cross section of a tear drop shape.

14. A variable choke according to claim 8 in which said tubular seal member is secured in an opening in one of said filler members and has an end face coplanar with the smooth flat surface thereof and engaging said flow selector member in a position aligned with said flow passage upon opening movement of said choke.

15. A variable choke according to claim 1 in which said operating means includes means for indicating the amount of movement of said flow selector member.

16. A variable choke according to claim 15 in which said operating means comprises a rising threaded stem supported for threaded movement in said cover means, and
said indicating means comprises fixed indicia supported on said cover means and an indicator secured on said stem for movement therewith.

17. A variable choke according to claim 1 in which said tubular seal member is of silicon carbide.

18. A variable choke according to claim 1 in which said tubular outlet portion includes a tubular insert member of wear resistant material.

19. A variable choke according to claim 18 in which said outlet portion insert member is of silicon carbide.

20. A variable choke according to claim 1 in which said flow selector member is at least partially cylindrical in shape with the cylindrical surface fitting said cavity for sliding movement therein,
said flow selector member having a smooth flat surface on said upstream side slidably engaging the end of said tubular seal member, and
said passage means extending laterally through said flow selector member from said flat surface to a point on the other side thereof alignable with the bore of said outlet portion.

21. A variable choke according to claim 20 in which said flow controlling passage means comprises a plurality of separate passages,
said separate passages each including a tubular sleeve insert of wear resistant metal, and
said sleeve inserts being of different cross sectional areas and movable successively into alignment with said seal member end portion to permit a selected flow therethrough.

22. A variable choke according to claim 20 in which said flow controlling passage means comprises a single passage having a cross sectional configuration varying in width whereby movement thereof relative to said seal member end portion provides a variable fluid flow opening.

23. A variable choke according to claim 22 in which said single passage has a cross section of a tear drop shape.

24. A variable choke according to claim 20 in which said operating means comprises a rising threaded stem supported for threaded movement in said cover means, and
indicating means comprising fixed indicia supported on said cover means and an indicator secured on said stem for movement therewith and operable to indicate the extent of movement of said flow selector member.

25. A variable choke according to claim 20 in which said tubular seal member is of silicon carbide.

26. A variable choke according to claim 20 in which said tubular outlet portion includes a tubular insert member of wear resistant material.

27. A variable choke according to claim 26 in which said outlet portion insert member and said tubular seal member are each of silicon carbide.

28. A variable choke according to claim 1 in which said tubular seal member is secured in said recess in said insert member and has an end face engaging said flow selector member in a position aligned with said flow passageway means upon opening movement of said choke.

* * * * *